(12) United States Patent
Kurian

(10) Patent No.: US 11,188,897 B2
(45) Date of Patent: Nov. 30, 2021

(54) MULTI-TIERED DIGITAL WALLET SECURITY

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 675 days.

(21) Appl. No.: 15/895,187

(22) Filed: Feb. 13, 2018

(65) Prior Publication Data

US 2019/0251552 A1 Aug. 15, 2019

(51) Int. Cl.
*G06Q 20/36* (2012.01)
*G06Q 20/06* (2012.01)
(Continued)

(52) U.S. Cl.
CPC ....... *G06Q 20/3674* (2013.01); *G06Q 20/065* (2013.01); *G06Q 20/382* (2013.01); *H04L 67/104* (2013.01)

(58) Field of Classification Search
None
See application file for complete search history.

(56) References Cited

U.S. PATENT DOCUMENTS 7,908,645 B2 * 3/2011 Varghese ............... G06F 21/552
726/4
8,195,576 B1 * 6/2012 Grigg ............... G06Q 20/40145
705/67

(Continued)

FOREIGN PATENT DOCUMENTS

JP 2021507564 A * 12/2017
WO WO-2016008659 A1 * 1/2016 ............. G06Q 20/36
WO WO-2019116249 A1 * 6/2019 ............. H04L 9/085

OTHER PUBLICATIONS

Security of Cryptocurrency Using Hardware Wallet and QR Code. https://ieeexplore.ieee.org/stamp/stamp.jsp?tp=&arnumber=8966739 (Year: 2019).*

(Continued)

*Primary Examiner* — El Mehdi Oussir

(74) *Attorney, Agent, or Firm* — Banner & Witcoff, Ltd.; Michael A. Springs

(57) ABSTRACT

Methods, systems, and apparatuses for facilitating multi-tiered digital wallet security are described herein. In some arrangements, a computing platform configured to operate within one or more decentralized peer-to-peer (P2P) networks may provide a digital wallet interface to a user computing device. Through the digital wallet interface, a user of the user computing device may be able to partition digital currency holdings into one or more differentiated storage compartments or tiers. Each of the one or more compartments may be password secured and may only permit access to the amount of digital currency holdings specified by the user. The user of the user computing device may enter a password corresponding to a compartment and the computing platform may provide access to the compartment based on the provided password. E.g., successive tiers may provide successively more limited (or enhanced) access to available funds, permissions, and the like.

20 Claims, 12 Drawing Sheets

(51) Int. Cl.
  *G06Q 20/38* (2012.01)
  *H04L 29/08* (2006.01)

(56) References Cited

U.S. PATENT DOCUMENTS

| | | | |
|---|---|---|---|
| 9,298,806 B1 | 3/2016 | Vessenes et al. | |
| 9,397,985 B1 | 7/2016 | Seger, II et al. | |
| 9,672,499 B2 | 6/2017 | Yang et al. | |
| 9,881,447 B2 | 1/2018 | Guase et al. | |
| 9,881,448 B2 | 1/2018 | Arnone et al. | |
| 9,881,450 B2 | 1/2018 | Singer et al. | |
| 9,881,451 B2 | 1/2018 | Arnone | |
| 9,881,452 B2 | 1/2018 | Arnone et al. | |
| 9,881,453 B2 | 1/2018 | Graham et al. | |
| 9,881,454 B2 | 1/2018 | Arnone et al. | |
| 9,881,458 B2 | 1/2018 | Arnone et al. | |
| 9,881,459 B2 | 1/2018 | Caputo et al. | |
| 9,881,460 B2 | 1/2018 | Basallo et al. | |
| 9,881,461 B2 | 1/2018 | Arnone et al. | |
| 9,881,470 B2 | 1/2018 | Baynes et al. | |
| 9,881,473 B1 | 1/2018 | Diorio et al. | |
| 9,881,474 B2 | 1/2018 | Fadell et al. | |
| 9,881,512 B2 | 1/2018 | Jeyanandarajan | |
| 9,882,911 B2 | 1/2018 | Baltar et al. | |
| 9,883,073 B2 | 1/2018 | Chapman | |
| 9,883,090 B2 | 1/2018 | Glasgow | |
| 9,883,238 B2 | 1/2018 | Farb et al. | |
| 9,883,387 B2 | 1/2018 | Wilson et al. | |
| 9,883,393 B2 | 1/2018 | Dipaola | |
| 9,884,621 B2 | 2/2018 | Tarte et al. | |
| 9,885,584 B2 | 2/2018 | Nallu et al. | |
| 9,886,161 B2 | 2/2018 | Laska et al. | |
| 9,886,262 B2 | 2/2018 | Thomas et al. | |
| 9,886,282 B2 | 2/2018 | Canterbury et al. | |
| 9,886,306 B2 | 2/2018 | Hildrum et al. | |
| 9,886,307 B2 | 2/2018 | Hildrum et al. | |
| 9,886,466 B2 | 2/2018 | Parikh et al. | |
| 9,886,483 B1 | 2/2018 | Harrison et al. | |
| 9,886,490 B1 | 2/2018 | Kapoor et al. | |
| 9,886,511 B2 | 2/2018 | Patel et al. | |
| 9,886,620 B1 | 2/2018 | Dixon et al. | |
| 9,886,653 B2 | 2/2018 | Bhardwaj et al. | |
| 9,886,685 B2 | 2/2018 | Keohane et al. | |
| 9,886,689 B1 | 2/2018 | Paulin et al. | |
| 9,886,712 B2 | 2/2018 | Desmarais et al. | |
| 9,886,720 B2 | 2/2018 | Hertel et al. | |
| 9,886,820 B2 | 2/2018 | Arnone et al. | |
| 9,886,821 B2 | 2/2018 | Farrar | |
| 9,886,824 B2 | 2/2018 | Bristol et al. | |
| 9,886,833 B2 | 2/2018 | Noland et al. | |
| 9,886,845 B2 | 2/2018 | Rhoads et al. | |
| 9,887,887 B2 | 2/2018 | Hunter et al. | |
| 9,887,947 B2 | 2/2018 | Snider et al. | |
| 9,887,965 B2 | 2/2018 | Kay et al. | |
| 9,888,007 B2 * | 2/2018 | Caldera | H04W 12/068 |
| 9,888,026 B2 | 2/2018 | Kaplan et al. | |
| 9,888,067 B1 | 2/2018 | Yemini et al. | |
| 9,888,363 B2 | 2/2018 | Addepalli et al. | |
| 9,959,694 B2 * | 5/2018 | Lindsay | G07F 7/1025 |
| 10,891,600 B2 * | 1/2021 | Rebernik | G06Q 20/36 |
| 2015/0170112 A1 | 6/2015 | DeCastro | |
| 2015/0324789 A1 | 11/2015 | Dvorak et al. | |
| 2016/0071096 A1 | 3/2016 | Rosca | |
| 2016/0171492 A1 * | 6/2016 | Carrott | G06Q 20/382 705/71 |
| 2016/0203477 A1 | 7/2016 | Yang et al. | |
| 2016/0261404 A1 | 9/2016 | Ford et al. | |
| 2016/0292672 A1 * | 10/2016 | Fay | G06Q 20/3829 |
| 2016/0292680 A1 | 10/2016 | Wilson, Jr. et al. | |
| 2016/0321441 A1 * | 11/2016 | Tonoyan | G06F 21/32 |
| 2017/0068953 A1 * | 3/2017 | Kim | G06Q 20/382 |
| 2017/0140375 A1 | 5/2017 | Kunstel | |
| 2017/0178237 A1 | 6/2017 | Wong | |
| 2017/0237736 A1 * | 8/2017 | Eber | H04L 63/0876 726/4 |
| 2018/0204191 A1 * | 7/2018 | Wilson | H04L 9/3242 |
| 2018/0294977 A1 * | 10/2018 | Uhr | H04L 9/32 |
| 2019/0121988 A1 * | 4/2019 | van de Ruit | H04L 9/0825 |
| 2019/0295054 A1 * | 9/2019 | Purves | G06Q 20/28 |
| 2020/0027079 A1 * | 1/2020 | Kurian | H04L 63/083 |
| 2021/0297424 A1 * | 9/2021 | Biyani | H04L 9/0833 |

OTHER PUBLICATIONS

"Keepsafe Photo Vault & Lock App: Hide Photos—Cloud Storage," retrieved Feb. 8, 2018 from https://www.getkeepsafe.com, 4 pages.
"Private Photo Vault—#1 iOS Photo Privacy App—Now on Android," Copyright 2011-2016, Legendary Sortward Labs, LLC, retrieved Feb. 8, 2018 from https://privatephotovault.com/, 2 pages.

* cited by examiner

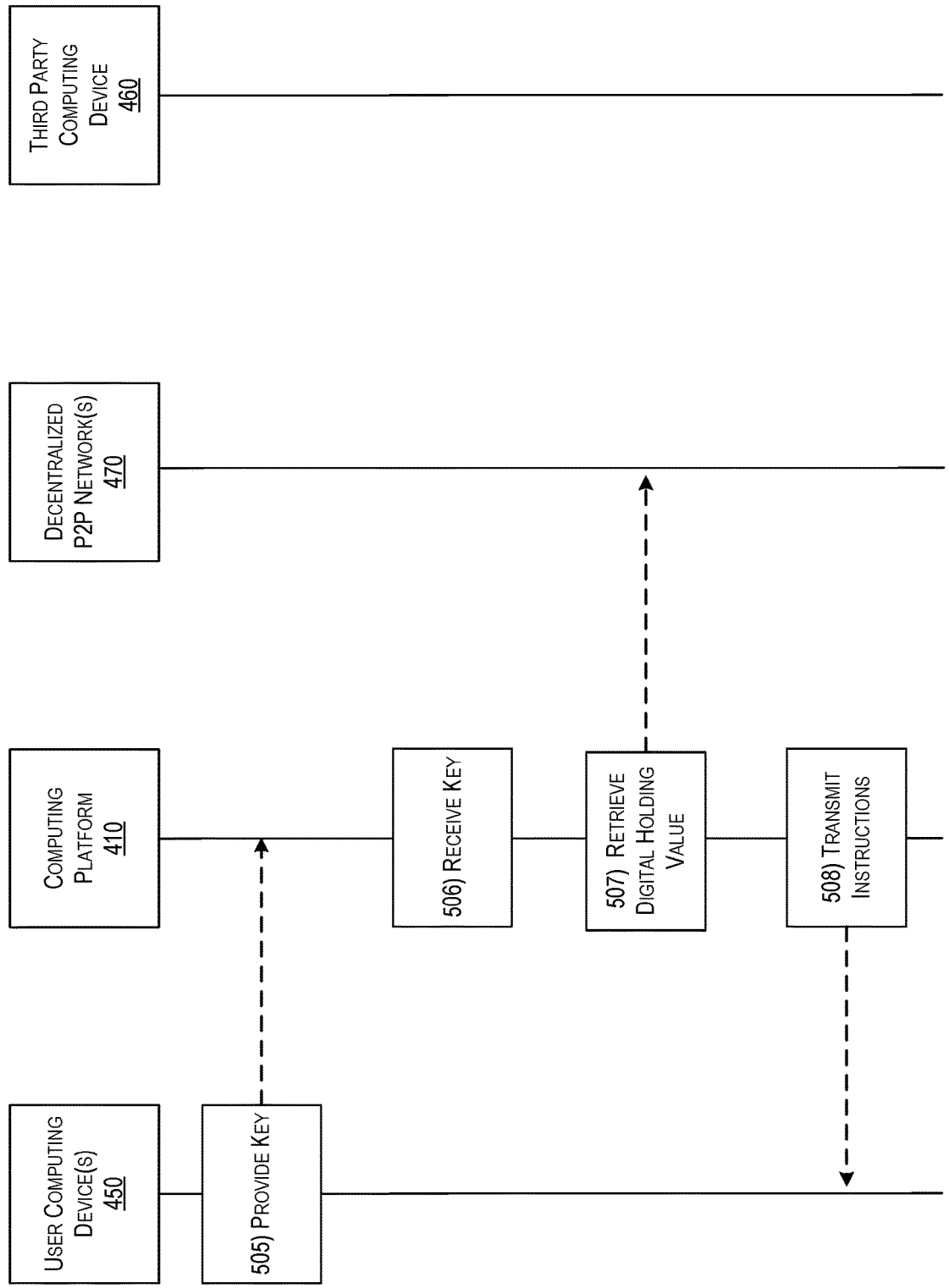

MULTI-TIERED DIGITAL WALLET SECURITY

FIELD

Aspects described herein generally relate to decentralized peer-to-peer computer systems specialized for the purpose of managing a blockchain. In particular, one or more aspects of the disclosure relate to the secure handling of digital currency with a multi-tiered digital wallet interface.

BACKGROUND

With the increasing amount of attention being placed on digital currencies such as Bitcoin and Ethereum, it has become vital to develop digital wallet infrastructure so that holders of digital currencies are able to store their coins safely and securely. However, existing digital wallet infrastructure is underdeveloped and provides many pathways for failure and unauthorized use. For example, existing digital wallets either require users to maintain their own private keys or allow for their private keys to be held by third parties. In arrangements in which users control their own private keys, users run the risk of forgetting or mishandling their private keys and losing access to their digital wallets, as well as having robbers forcibly require the users to provide access to their digital wallets through entry of their private keys. In arrangements in which users allow third parties to control their private keys, users forfeit complete control over their digital currency by trusting the third parties to ensure the safety of their private keys and digital currency. Accordingly, there is an ongoing need for better digital wallet infrastructure that provides users with the ability to store their digital currency safely and securely.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards facilitating multi-tiered digital wallet security.

In accordance with one or more embodiments, a computing platform configured to operate in a peer-to-peer (P2P) network and including at least one or more processors and memory storing at least a digital wallet interface may provide the digital wallet interface to a user computing device. The computing platform may instruct the user computing device to display a password entry interface. The computing platform may receive, from the user computing device through the password entry interface, a password, wherein a first password corresponds to a first wallet tier of the digital wallet interface and a second password corresponds to a second wallet tier of the digital wallet interface. Based on whether the password provided by the user is the first password or the second password, the computing platform may provide access to either the first tier or the second tier of the digital wallet interface.

In some embodiments, the first password is associated with a first alphanumeric string and the second password is associated with a second alphanumeric string, and wherein the second alphanumeric string is longer than the first alphanumeric string.

In some embodiments, the first tier wallet is associated with a first amount of funds and the second tier wallet is associated with a second amount of funds, and wherein the second amount of funds is greater than the first amount of funds.

In some embodiments, the digital wallet interface associated with the user comprises a central core and a plurality of wallet tiers, including at least the first wallet tier and the second wallet tier.

In some embodiments, the central core of the digital wallet interface is associated with a third amount of funds greater than the first amount of funds associated with the first tier wallet and the second amount of funds associated with the second tier wallet.

In some embodiments, the central core of the digital wallet interface is associated with a multi-signature password.

In some embodiments, a first-signature password comprising the multi-signature password is required to be entered by an entity within a particular geographical region.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5F depict an illustrative event sequence for facilitating multi-tiered digital wallet security that may be used in accordance with one or more example embodiments described herein;

DETAILED DESCRIPTION

Figure 1:
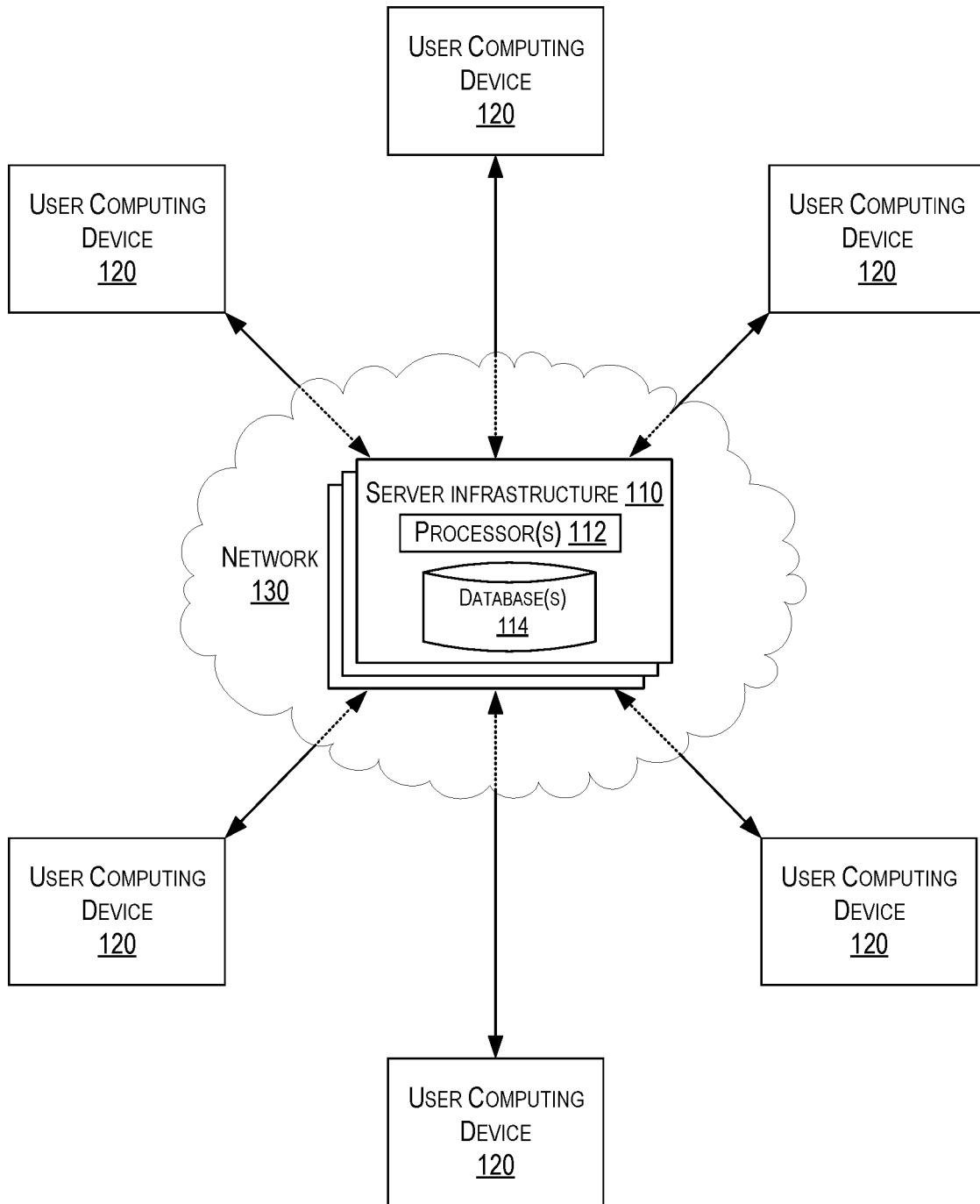
FIG. 1 depicts an illustrative centralized computer system that may be used in accordance with one or more example embodiments described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards facilitating multi-tiered digital wallet security. A computing platform configured to operate within one or more decentralized peer-to-peer (e.g., P2P) networks may provide a digital wallet interface to a user computing device. Through the digital wallet interface, a user of the user computing device may be able to abstract digital currency holdings into one or more logical compartments. Each of the one or more logical compartments may be password secured and may only permit access to the amount of digital currency holdings abstracted by the user. In this way, the user may be able to partition their total digital currency holdings into a plurality of abstracted compartments which only allow access to the particular, user-specified amount of digital currency. Through doing so, users may be able to hold their digital currency more safely and securely as compared to existing digital wallet infrastructure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election selections, personal records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
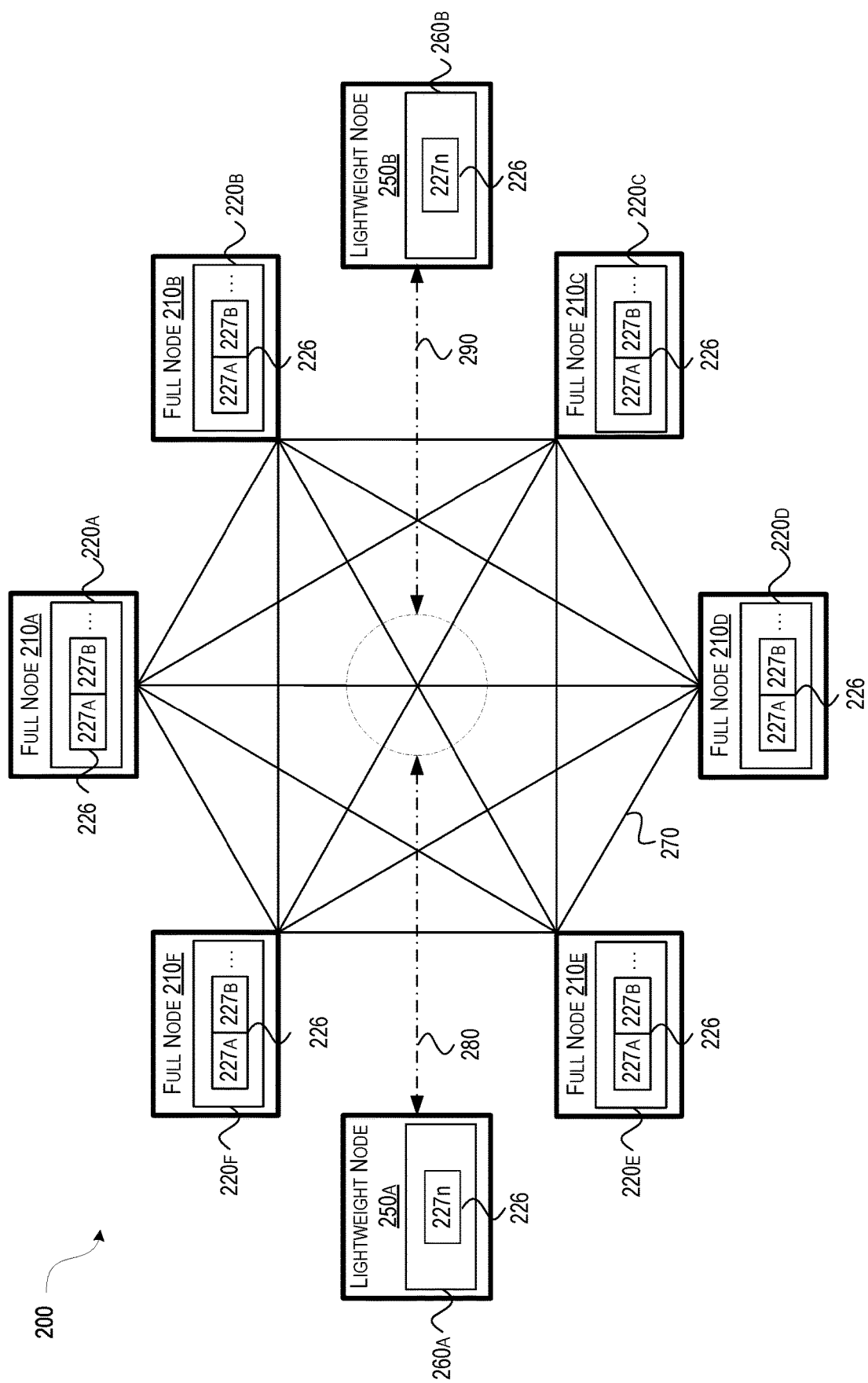
FIG. 2 depicts an illustrative decentralized P2P computer system that may be used in accordance with one or more example embodiments described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to select delegates based on balance sheet holdings associated with the respective wallets. Full node computing devices 210A-210F, however, may not select themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, election selections, personal records, currency exchange and remittance, P2P transfers, ride sharing, gaming, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figures 3A, 3B:
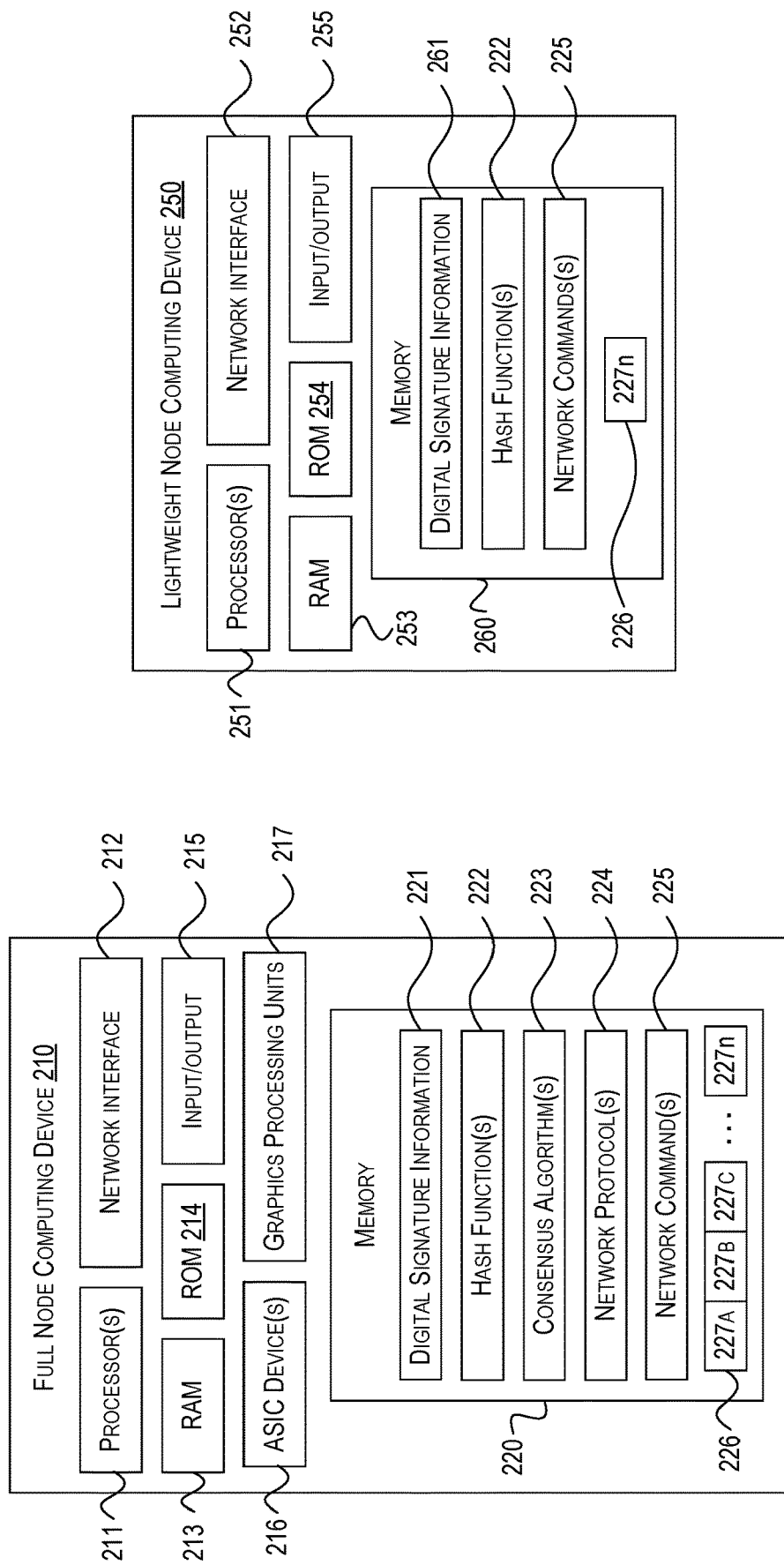
FIG. 3A depicts an illustrative full node computing device that may be used in accordance with one or more example embodiments described herein.
FIG. 3B depicts an illustrative lightweight node computing device that may be used in accordance with one or more example embodiments described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein.

Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Multi-Tiered Digital Wallet Security

Figure 4A:
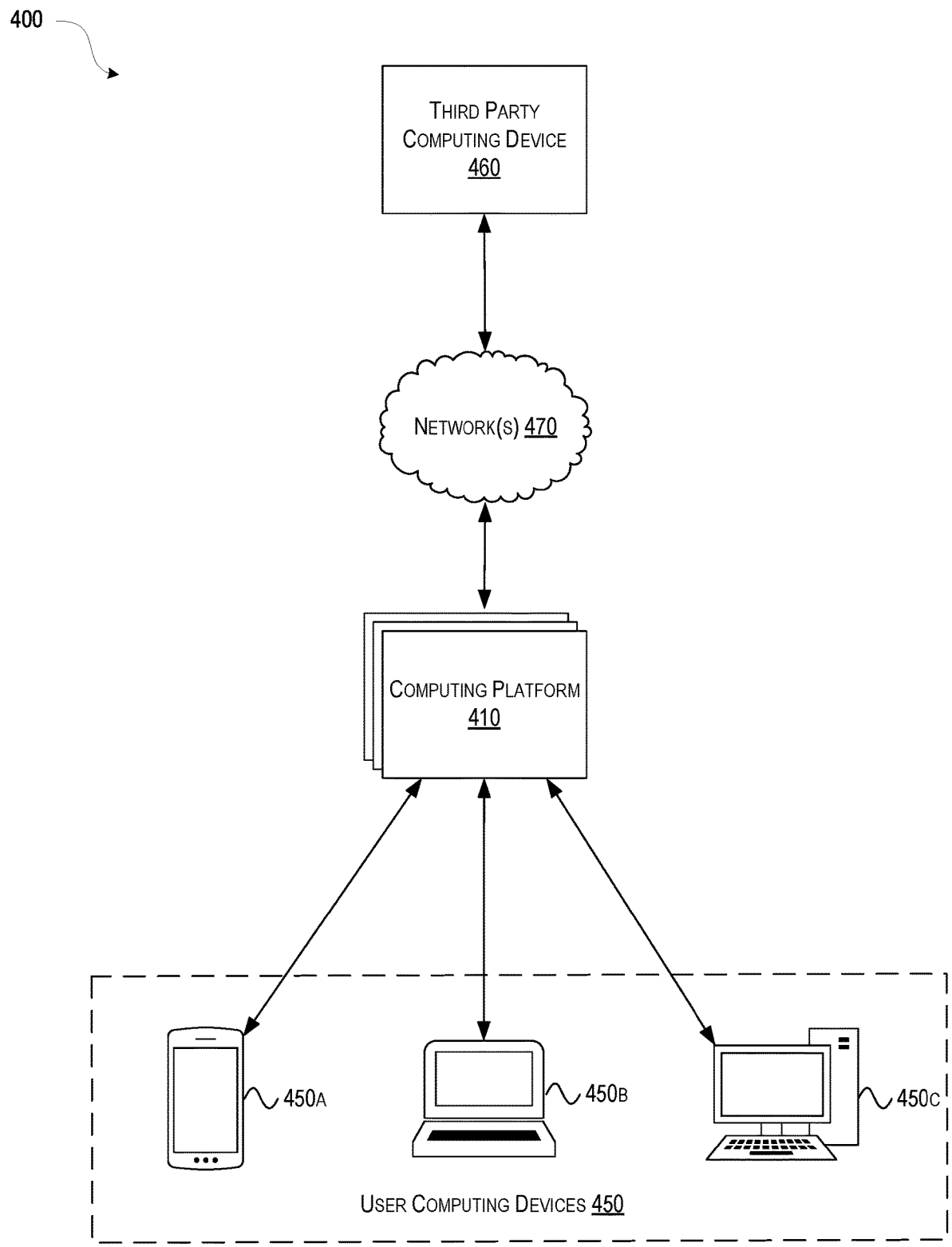
FIG. 4A depicts an illustrative computing environment for facilitating multi-tiered digital wallet security that may be used in accordance with one or more example embodiments described herein.

FIG. 4A depicts an illustrative computing environment for facilitating multi-tiered digital wallet security that may be used in accordance with one or more illustrative embodiments described herein. Referring to FIG. 4A, computing environment 400 may include computing platform 410, user computing devices 450 (e.g., user computing device 450A, user computing device 450B, and user computing device 450C), third party computing device 460, and one or more decentralized P2P networks 470. In some instances, one or more of computing platform 410, user computing devices 450, and third party computing device 460 may communicate via one or more decentralized P2P networks 470 and/or one or more other networks such as a public network or private network. Additionally, computing environment 400 may include other computing devices similar to computing environment 400 may include computing platform 410, user computing devices 450, and third party computing device 460. Such additional computing devices may be configured to communicate with computing platform 410, user computing devices 450, and/or third party computing device 460 through one or more decentralized P2P networks 470 and/or one or more other networks.

Computing platform 410 may be associated with a particular entity, such as a financial institution, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Computing platform 410 may be configured to interface with user computing devices 450, third party computing device 460, and/or other computing devices through one or more decentralized P2P networks 470 and/or one or more other networks. In particular, computing platform 410 may be able to transmit and receive information with user computing devices 450, third party computing device 460, and/or other computing devices. In some instances, the transmission of data between computing platform 410, user computing devices 450, third party computing device 460, and/or other computing devices may be conducted through one or more decentralized P2P networks 470 and/or other computing networks. Furthermore, computing platform 410 may be configured to operate in one or more decentralized P2P networks 470 as a full node and/or a lightweight node.

In arrangements in which computing platform 410 operates as a full node in one or more decentralized P2P networks 470, computing platform 410 may be similar to full node computing devices 210A-210F described above in regard to FIG. 2, as well as full node computing device 210 described above in regard to FIG. 3A. As such, computing platform 410 may be configured to execute requested network functions, maintain inter-nodal agreement as to the state of blockchains respective to each of one or more decentralized P2P networks 470, and request execution of network functions including transfer and/or smart contract operations.

In arrangements in which computing platform 410 operates as a lightweight node on one or more decentralized P2P networks 470, computing platform 410 may be similar to lightweight node computing devices 250A and 250B described above in regard to FIG. 2, as well as lightweight node computing device 250 described above in regard to FIG. 3B. As a lightweight node computing device, computing platform 410 may be configured to interface with one or more decentralized P2P networks 470 by requesting execution of network functions related to one or more decentralized P2P networks 470.

To facilitate multi-tiered digital wallet security, computing platform 410 may provide digital wallet infrastructure to one or more users of user computing devices 450, third party computing device 460, and/or other computing devices and may serve as a blockchain client and/or gateway through which users may able to interface with one or more decentralized P2P networks 470. In particular, computing platform 410 may provide a digital wallet interface for providing access to digital currency associated with one or more decentralized P2P networks 470 to one or more users of user computing devices 450, third party computing device 460, and/or other computing devices. The digital wallet interface may provide an abstraction layer to logically compartmentalize digital currency possessed by a user. For example, the digital wallet interface may provide a central wallet core (e.g., central core, wallet core, core, inner wallet, and the like) and a plurality of wallet tiers (e.g., wallet edges, tiers, edges, outer wallets, outer wallet tiers, outer wallet edges, and the like) which may provide separate, abstracted containers for accessing portions of a user's digital currency.

For example, the central core of the digital wallet interface may provide a logical abstraction layer through which a user may associate and access a first portion of their digital currency holdings. In some instances, the first portion may be a majority portion (e.g., a portion greater than or equal to 51% of a user's digital currency holdings). In other instances, however, the central core may not necessarily be associated with a majority portion of a user's digital currency holdings and instead may be associated with any amount of a user's holdings.

Additionally, the central core may be secured by one or more passwords and/or access criteria. For example, in order to access the central core of the digital wallet interface, a user may be required to enter one or more passwords. In some instances, the one or more passwords may include a combination of alphanumeric strings, biometric data (e.g., retina data, facial recognition data, fingerprint data, and so on), keystore files (e.g., UTC/JSON), third party applications, mnemonic phrases, and so on. Additionally, at least one of the one or more passwords may be associated with an auxiliary hardware device such as a hardware wallet and/or two-factor authentication (e.g., 2FA) device and/or application. The central core may further be associated with a particular computing device (e.g., one of user computing device 450A, 450B, and 450C) and may only be accessed through password entry at the particular computing device. It is also contemplated that the central core may only be accessed at a predefined time (e.g., between 7 am and 9 am, between 5 pm and 7 pm, and/or at any other time specified by a user) and/or at a predefined location (e.g., at a user's home, a bank location associated with the entity corresponding to computing platform 410, and/or at any other location specified by a user). In some instances, the central core may be further secured by a multi-signature contract which requires the entry of passwords and/or biometric data by each of a plurality of entities defined by the multi-signature contract before access to the central core is allowed. In some instances, a first-signature password comprising the multi-signature password may be required to be entered by an entity within a particular geographical region. In one illustrative example, the entity corresponding to computing platform 410 may be an entity with multi-signature responsibility. In such an example, if a user wishes to access the central core secured by a multi-signature contract, the user may be required to enter their respective password and/or biometric data associated with the central core, in addition to having at least an employee of the entity corresponding to computing platform 410 enter password and/or biometric information.

The digital wallet interface may further include a plurality of wallet tiers which may provide additional logical abstraction layers through which users may associate and access portions of their digital currency. For example, the digital wallet interface may include a first tier associated with a second portion of a user's digital currency holdings, a second tier associated with a third portion of a user's holdings, a third tier associated with a fourth portion of the user's holdings, and so on until the entirety of digital currency held by the user is distributed across the central core and the plurality of wallet tiers. In some instances, the tiers may be used to incrementally distribute a user's digital currency, wherein a first tier may be associated with less digital currency than a second tier, which may be associated with less digital currency than a third tier, and so on, where the majority of user's digital currency is associated with the wallet core.

Each of the plurality of wallet tiers may be secured by one or more passwords and/or access criteria. For example, in order to access a first tier of the digital wallet interface, a user may be required to enter a four digit password. In order to access a second tier of digital wallet interface, a user may be required to enter a ten digit password. In order to access a third tier of the digital wallet interface, the user may be required to enter a 25 digit password and provide biometric data. Additionally, at least one of the one or more passwords for the plurality of tiers of the digital wallet interface may be associated with an auxiliary hardware device such as a hardware wallet and/or two-factor authentication device. In some instances, each of the plurality of wallet tiers of the digital wallet interface may further be associated with a particular computing device (e.g., one of user computing device 450A, 450B, and 450C) and may only be accessed through password entry at the particular computing device. In other instances, however, each of the plurality of tiers may be accessed by any of user computing devices 450.

Through the digital wallet interface, computing platform 410 may provide a portal through which a user may enter one or more private keys associated with one or more decentralized P2P networks 470 in order for the user to access digital currency holdings related to the one or more private keys with the multi-tiered digital wallet interface. Additionally and/or alternatively, computing platform 410 may be configured to generate one or more private keys associated with one or more decentralized P2P networks 470 for users. In either arrangement, the digital wallet interface provided by computing platform 410 may enable users to abstract digital currency holdings associated with each of their one or more private keys into a central core and/or one or more wallet tiers. Through the digital wallet interface, a user may be able to create one or more passwords and/or access parameters for the central core and/or one or more wallet tiers.

While the digital wallet interface provided by computing platform 410 may enable users to abstract digital currency holdings into a number of compartmentalized, password protected logical containers (e.g., central core and wallet tiers), the digital wallet interface may maintain the public/private key pair for the user for each of the one or more decentralized P2P networks 470 and all transactions provided by the user through the digital wallet interface may be associated with the public/private key pair for each of the one or more decentralized P2P networks 470. For example, a user may have digital currency holdings comprising 10 bitcoin (e.g., 10 BTC) and 100 ether (e.g., 100 ETH) respectively associated with a public/private key pair on the Bitcoin decentralized P2P network and a public/private key pair on the Ethereum decentralized P2P network. Through the digital wallet interface, the user may abstract the digital currency holdings such that 10 BTC and 90 ETH are associated with the central core of the digital wallet interface and 10 ETH are associated with an outer wallet tier. In the event that the user wishes to transmit 4 ETH, for example, out of the outer wallet tier, the user may enter the one or more passwords associated with the tier and specify a transfer operation for 4 ETH through the digital wallet interface. After doing so, the digital wallet interface may sign the transfer operation with the public/private key pair corresponding to the Ethereum decentralized P2P network and coordinate with computing platform 410 to provide the transfer operation (e.g., network function request) to the Ethereum decentralized P2P network. In this way, the network function request is still related to the public/private key pair on the Ethereum decentralized P2P network of the user, but access to only the limited amount of ether (e.g., 10 ETH) is provided through the outer wallet tier.

Similarly, in the event that the user wishes to transmit bitcoin and ether out of the central core, the user may enter the one or more passwords associated and fulfill the one or more access criteria of corresponding to the central core and specify a first transfer operation for 5 BTC and a second transfer operation for 50 ETH, for example, through the digital wallet interface. After doing so, the digital wallet interface may sign the first transfer operation with the public/private key pair on the Bitcoin decentralized P2P network and the second transfer operation with the public/private key pair corresponding to the Ethereum decentralized P2P network and coordinate with computing platform 410 to provide the transfer operations to the Bitcoin decentralized P2P network and the Ethereum decentralized P2P network. In this way, the network function requests are still respectively related to the public/private key pair on the Bitcoin decentralized P2P network and the public/private key pair on the Ethereum decentralized P2P network of the user, but access to only the digital currency of the central core is provided.

User computing devices 450 may include one or more specialized personal computer(s), server computer(s), handheld or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, which are purposely configured for use as described herein. User computing devices 450 may include a first user computing device 450A, a second user computing device 450B, and a third user computing device 450C. In some instances, additional user computing devices 450 may be included in computing environment 400. User computing devices 450 may be configured to communicate with computing platform 410, third party computing device 460, and/or other computing devices through one or more decentralized P2P networks 470 and/or other computing networks. In particular, computing platform 410 may be able to transmit and receive information with computing platform 410, third party computing device 460, and/or other computing devices through one or more decentralized P2P networks 470 and/or other computing networks.

In some instances, user computing devices 450 may be configured to download the digital wallet interface from computing platform 410. In such instances, user computing devices 450 may interface with computing platform 410, through the downloaded digital wallet interface, to request execution of network function requests corresponding to one or more decentralized P2P networks 470. Additionally and/or alternatively, user computing devices 450 may be configured to access the digital wallet interface through a URL associated with computing platform 410. In other instances, user computing devices 450 may be configured to download a complete digital wallet package from computing platform 410 which may include the digital wallet interface and digital wallet infrastructure such as that described above in regard to FIGS. 2, 3A, and 3B. In such instances, the complete digital wallet package may cause user computing devices 450 to function as either full-node computing devices and/or lightweight-node computing devices.

In arrangements in which user computing devices 450 operate as a full nodes in one or more decentralized P2P networks 470, user computing devices 450 may be similar to full node computing devices 210A-210F described above in regard to FIG. 2, as well as full node computing device 210 described above in regard to FIG. 3A. As such, user computing devices 450 may be configured to execute requested network functions, maintain inter-nodal agreement as to the state of blockchains respective to each of one or more decentralized P2P networks 470, and request execution of network functions including transfer and/or smart contract operations.

In arrangements in which user computing devices 450 operate as a lightweight node on one or more decentralized P2P networks 470, user computing devices 450 may be similar to lightweight node computing devices 250A and 250B described above in regard to FIG. 2, as well as lightweight node computing device 250 described above in regard to FIG. 3B. As a lightweight node computing device, user computing devices 450 may be configured to interface with one or more decentralized P2P networks 470 by requesting execution of network functions related to one or more decentralized P2P networks 470.

Third party computing device 460 may include one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Third party computing device 460 may be configured to communicate with computing platform 410, user computing devices 450, and/or other computing devices through decentralized P2P network 470 and/or other computing networks. In particular, third party computing device 460 may be able to transmit and receive information with computing platform 410, third party computing device 460, and/or other computing devices through decentralized P2P network 470 and/or other computing networks. In some instances, the transmission of data between third party computing device 460 and computing platform 410, user computing devices 450, and/or other computing devices may be conducted through one or more decentralized P2P networks 470 and/or other computing networks. Furthermore, third party computing device 460 may be configured to operate in one or more decentralized P2P networks 470 as a full node and/or a lightweight node and, as such, may be similar to full node computing devices 210A-210F described above in regard to FIG. 2, as well as full node computing device 210 described above in regard to FIG. 3A and/or lightweight node computing devices 250A and 250B described above in regard to FIG. 2, as well as lightweight node computing device 250 described above in regard to FIG. 3B.

Figure 4B:
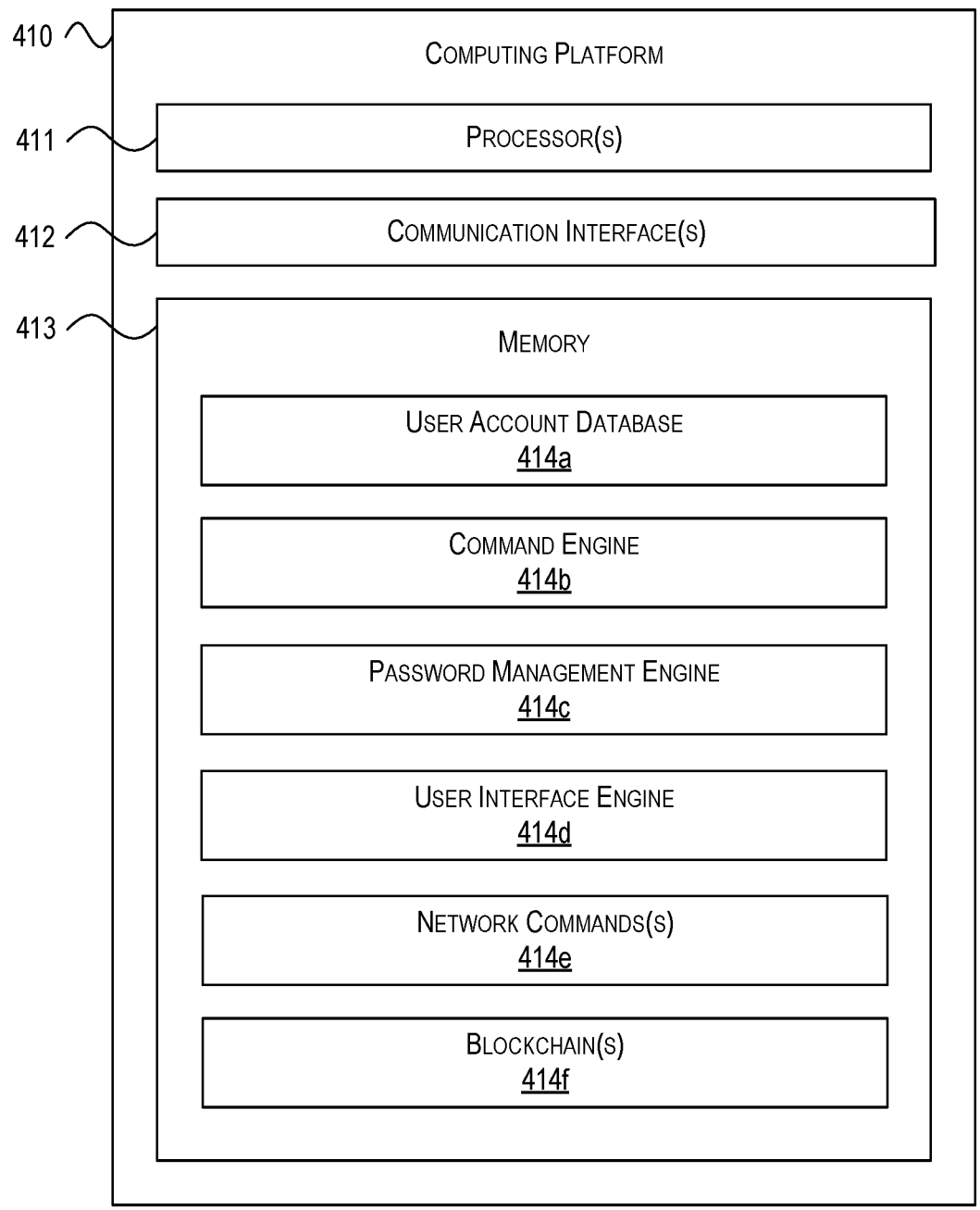
FIG. 4B depicts an illustrative computing device for facilitating multi-tiered digital wallet security that may be used in accordance with one or more example embodiments described herein.

FIG. 4B depicts an illustrative computing platform 410 that may be used in accordance with one or more example embodiments described herein. Referring to FIG. 4B, computing platform 410 may include processor(s) 411, communication interface(s) 412, and memory 413. A data bus may interconnect processor(s) 411, communication interface(s) 412, and memory 413. Communication interface(s) 412 may be one or more network interfaces configured to support communication between computing platform 410 and one or more decentralized P2P networks 470 and/or other computer networks. In arrangements in which computing platform 410 is configured to operate in one or more decentralized P2P networks 470 as a full node computing device, computing platform 410 may additionally include the hardware and/or software components of full node computing device 210 described in regard to FIG. 3A. Furthermore, in arrangements in which computing platform 410 is configured to operate in one or more decentralized P2P networks 470 as a lightweight node computing device, computing platform 410 may additionally include the hardware and/or software components of lightweight node computing device 250 described above in regard to FIG. 3B and/or the hardware and/or software components of full node computing device 210 described in regard to FIG. 3A.

Memory 413 may include one or more program engines having instructions that, when executed by processor(s) 411, cause computing platform 410 to perform one or more functions described herein and/or otherwise maintain information in one or more databases which may be used by such program engines and/or processor(s) 411. In some instances, the one or more program engines and/or databases may be stored by and/or maintained in different memory units of computing platform 410. For example, memory 413 may have, store, and/or include a user account database 414a, command engine 414b, password management engine 414c, user interface engine 414d, network commands(s) 414e, and blockchain(s) 414f.

User account database 414a may store information corresponding to user computing devices 450 as related to facilitating multi-tiered digital wallet security. For example, user account database 414a may store information corresponding to user of user computing devices 450 including a user identification number, public/private key information of the user related to one or more decentralized P2P networks 470, password and/or access criteria information for accessing a central core and/or one or more outer tiers of the digital wallet interface, and information related to the digital currency abstractions in the central core and/or one or more outer tiers. In some instances, however, the user account database 414a may not store private key information of the user related to one or more decentralized P2P networks 470.

Command engine 414b may store computer executable instructions that, when executed by processor(s) 411, cause computing platform 410 to handle one or more processes in providing multi-tier digital wallet security. For example, instructions comprised in command engine 414b may cause computing platform 410 to store user information in user account database 414a, receive information from one or more of user computing devices 450, third party computing device 460, and/or other computing devices, and route the received information to one or more of password management engine 414c, and/or user interface engine 414d. In some instances, command engine 414b may store additional instructions which cause computing platform 410 to perform other functions described herein.

Password management engine 414c may have instructions that direct and/or cause computing platform 410 to corroborate one or more passwords provided by a user of user computing devices 150 with one or more passwords previously provided the user and stored in user account database 414a. In some instances, password management engine 414c may store additional instructions which cause computing platform 410 to determine whether or not one or more access criteria, if specified by a user for accessing the central core and/or outer tiers of the digital wallet interface, have been fulfilled prior to allowing access to the central core and/or outer tiers. In doing so, password management engine 414c may compare access criteria information provided by user computing devices 450 to access criteria information previously stored in user account database 414a. In some instances, password management engine 414c may store additional instructions which cause computing platform 410 to perform other functions described herein.

User interface engine 414*d* may have instructions that direct and/or cause computing platform 410 to provide the digital wallet interface to user computing devices 150 responsive to either an application download request and/or web application access request. In some instances, user interface engine 414*d* may have instructions which cause computing platform 410 to associate particular aspects of the digital wallet interface with particular computing devices (e.g., user computing device 450A, 450B, and/or 450C) of a user. For example, in the event that a user configured the digital wallet interface such the central core is accessible at a first computing device (e.g., user computing device 450A), a first outer tier is accessible at a second computing device (e.g., user computing device 450B), and a second outer tier is accessible at a third computing device (e.g., user computing device 450C), user interface engine 414*d* may ensure that the central core is only displayed at the first computing device 450A, the first tier is only displayed at the second computing device 450B, and the second tier is only displayed at the third computing device 450C. In some instances, user interface engine 414*d* may store additional instructions which cause computing platform 410 to perform other functions described herein.

Network command(s) 414*e* may include particular sets of instructions which enable computing platform 410 to broadcast network function requests to one or more decentralized P2P networks 470. For example, in the event that a user wants to submit a transaction request on the Ethereum decentralized P2P network, network command(s) 414*e* may include a set of instructions which enable computing platform 410 to broadcast the transaction request to the Ethereum decentralized P2P network. Similarly, in the event that a user wants to submit a transaction request on the Bitcoin decentralized P2P network, network command(s) 414*e* may include a set of instructions which enable computing platform 410 to broadcast the transaction request to the Bitcoin decentralized P2P network. Network command(s) 414*e* may include additional sets of instructions which enable computing platform 410 to broadcast network function requests to other decentralized P2P networks. Through execution of network command(s) 414*e*, computing platform 410 may be configured to operate in one or more decentralized P2P networks 470 as a full node computing device and/or lightweight node computing device. As stated above, in arrangements in which computing platform 410 is configured to operate as a full node computing device in one or more decentralized P2P networks 470, computing platform 410 may additionally include the hardware and/or software components of full node computing device 210 described in regard to FIG. 3A. Furthermore, in arrangements in which computing platform 410 is configured to operate in one or more decentralized P2P networks 470 as a lightweight node computing device, computing platform 410 may additionally include the hardware and/or software components of lightweight node computing device 250 described above in regard to FIG. 3B and/or the hardware and/or software components of full node computing device 210 described in regard to FIG. 3A.

Furthermore, memory 413 of computing platform 410 may store one or more blockchains 414*f* corresponding to one or more decentralized P2P networks 470. Each of the one or more blockchains 414*f* may include one or more blocks of the one or more blockchains 414*f*. In instances in which computing platform is configured to operate as a full node computing device in one or more decentralized P2P networks 470, one or more blockchains 414*f* may be a complete replica or copy of the blockchains of one or more decentralized P2P networks 470. In instances in which computing platform 410 is configured to operate as a lightweight node computing device in one or more decentralized P2P networks 470, one or more blockchains 414*f* may be a partial replica or copy of the blockchains of one or more decentralized P2P networks 470.

FIGS. 5A-5F depict an illustrative event sequence for facilitating multi-tiered digital wallet security that may be used in accordance with one or more example embodiments described herein. While the steps of the event sequence of FIGS. 5A-5F are described in a particular order, it should be understood that the steps may be performed in any order without departing from the scope of the disclosure provided herein. Furthermore, even though the event sequence is described as being performed by a particular arrangement of computing devices and computer networks (e.g., computing platform 410, user computing devices 450, third party computing devices 460, and one or more decentralized P2P networks 470), the processes may be performed by a number of computing devices and/or computing networks greater or less than that described in regard to FIGS. 5A-5F.

Figure 5A:
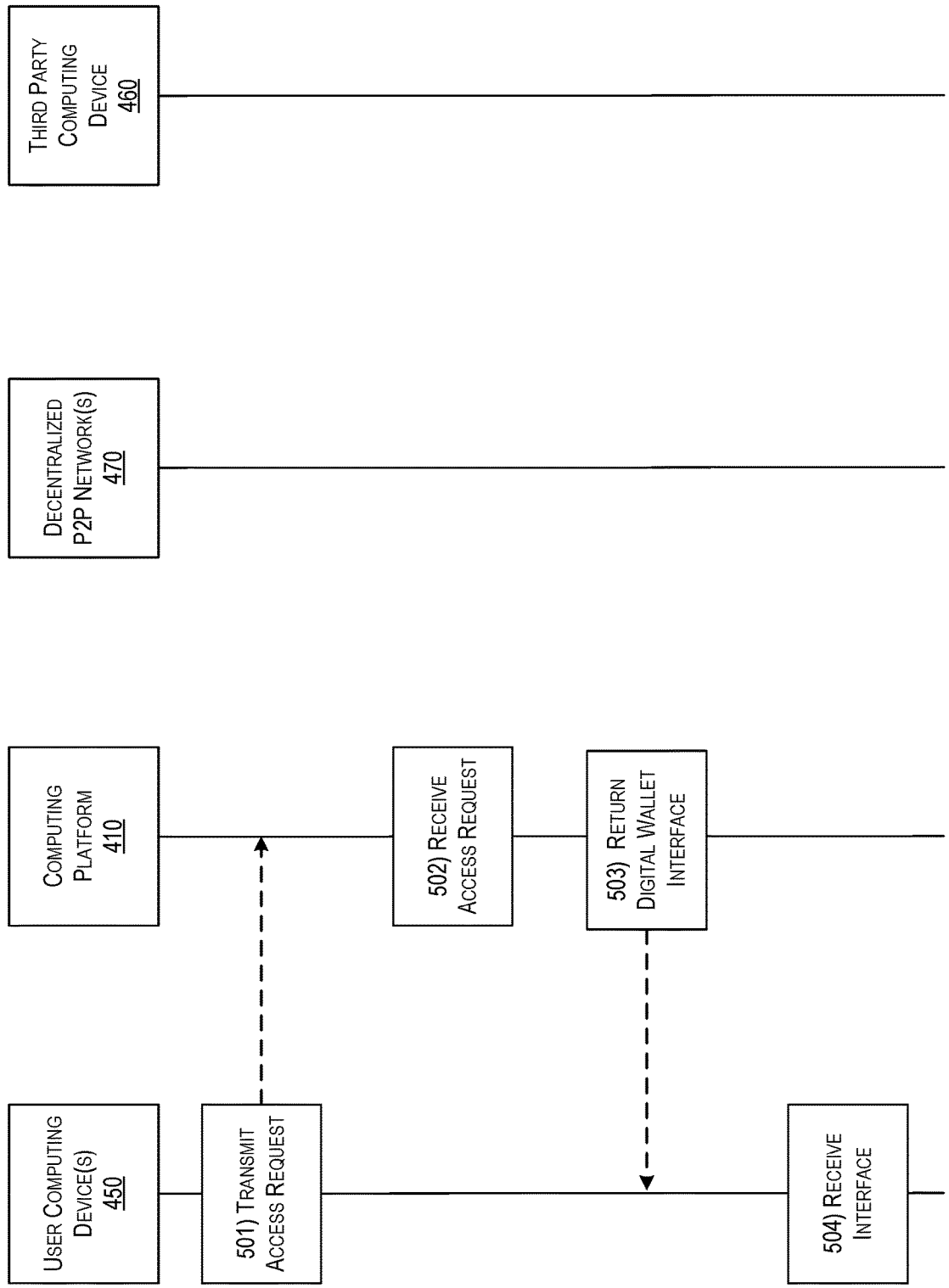

Referring to FIG. 5A, at step 501, a first user computing device (e.g., one of user computing device 450A, 450B, and 450C) of user computing devices 450 may transmit an access request to computing platform 410. In particular, the first user computing of user computing devices 450 may transmit an access request for the digital wallet interface to computing platform 410. The access request may be either an application download access request for the digital wallet interface or a web-application access request for a web presentation of the digital wallet interface. In some instances, the access request may be transmitted by the first user computing device of user computing devices 450 through one or more computing networks.

At step 502, computing platform 410 may receive the access request from the first user computing device of user computing devices 450. Handling of the access request provided by the first user computing device of user computing devices 450 by computing platform may be coordinated by command engine 414*b*. In particular, command engine 414*b* may cause computing platform 410 to receive and provide the access request to user interface engine 414*d*.

At step 503, computing platform 410 may return the digital wallet interface to the first user computing device of user computing devices 450 responsive to the access request. In the event that the access request provided by the first user computing device was an application download access request, computing platform 410 may provide the first user computing device of user computing devices 450 with the digital wallet interface by way of an application download. In particular, through execution of instructions of user interface engine 414*d* by processor(s) 411 of computing platform 410, computing platform 410 may transmit the application data for the digital wallet to the first user computing device. In the event that the access request provided by the first user computing device was a web application access request, computing platform 410 may provide the first user computing device of user computing devices 450 with the digital wallet interface in the form of a web application. In particular, through execution of instructions of user interface engine 414*d* by processor(s) 411 of computing platform 410, computing platform 410 may transmit the web application data for the digital wallet to the first user computing device. In some instances, the digital wallet interface provided to the first user computing device may be identified by a unique identifier associated with the first user computing device.

At step 504, the first user computing device of user computing devices 450 may receive either the application or web application information of the digital wallet interface from computing platform 410. In the event that the first user computing device received information for the web application of the digital wallet interface, the information may be received through a web browser associated with the first user computing device of user computing devices 450. Alternatively, in the event that the first user computing devices received information for the application of the digital wallet interface, the information may be received through an application download manager at the first user computing device of user computing devices 450.

Referring to FIG. 5B, at step 505, the first user computing device of user computing devices 450 may provide a key related to one or more decentralized P2P networks 470. In particular, the first user computing device of user computing devices 450 may provide one or more public and/or private keys, through the digital wallet interface, to computing platform 410. In some instances, the one or more private and/or public keys may be associated respectively with one or more decentralized P2P networks. For example, a user of the first user computing device may provide to user computing platform 410 a first private and/or public key corresponding to a first decentralized P2P network, a second private and/or public key corresponding to a second decentralized P2P network, and so on.

In some instances, the digital wallet interface may query the user of the first user computing device of user computing devices 450 for both public and private key information associated with one or more decentralized P2P networks. The public/private key pairs provided by the user maybe associated with previously created accounts on one or more decentralized P2P networks 470. Additionally and/or alternatively, the digital wallet interface may query the user of the first user computing device of user computing devices 450 whether or not the user would like to generate a public/private key pair for any of the one or more decentralized P2P networks 470. Furthermore, the digital wallet interface may provide the option or require the user to select whether or not the private key should be stored at computing platform 410 or locally at the first user computing device. In doing so, the digital wallet interface may enable a user to have greater control over how their private key is handled than conventional digital wallet systems.

At step 506, computing platform 410 may receive one of the public and/or private keys, through the digital wallet interface and from the first user computing device, corresponding to one or more decentralized P2P networks 470. For example, in instances in which the user of the first user computing device specifies that the private key is not be stored on computing platform 410, the first user computing device may transmit the public key of the private/public key pair to computing platform 410, which may be received by computing platform 410 at step 506. The private key of the private/public key pair may be stored locally on the first user computing device. In instances in which the user of the first user computing device specifies that the private key is to be stored on computing platform 410, the first user computing device may transmit the private key of the private/public key pair to computing platform 410, which may be received by computing platform 410 at step 506. The public key may additionally be included.

In some instances, computing platform 410 may store the public and/or private key provided by the user in user account database 414a. In particular, command engine 414b of computing platform 410 may store instructions which causes computing platform 410 to store the public and/or private key of the user in user account database 414a.

At step 507, computing platform 410 may retrieve digital currency holding information corresponding to the public key from one or more decentralized P2P networks 470. In particular, command engine 414b of computing platform 410 may cause computing platform 410 to retrieve and/or query one or more decentralized P2P networks 470 with the public key provided by the user to identify the digital currency holdings associated with the public key. In some instances, computing platform 410 may analyze one or more blockchains 414f based on the public key provided by the user to identify the digital currency holdings associated with the public key of the user. Additionally and/or alternatively, the digital currency holding information may be determined based on the private key in instances in which the private key is provided by the user.

After retrieving the digital currency holding information corresponding to the public key, computing platform 410 may store the digital currency holding information in user account database 414a. Through doing so, computing platform 410 may provide a foundation for the abstractions made by the user in creating the central core and/or plurality of wallet tiers through the digital wallet interface.

At step 508, computing platform 410 may transmit instructions to the first user computing device for generating logical abstractions of the digital currency holdings identified at step 507. In particular, user interface engine 414d may cause the first user computing device to display a configuration user interface through which the user may be able to configure the digital wallet interface by activating a central core and one or more wallet tiers. In some instances the configuration interface may include one or more portals through which the user may specify an amount of holdings to be abstracted in the central core, a number of wallet tiers for which to establish logical abstractions, and an amount of holdings to be associated with each of the wallet tiers. Furthermore, the configuration interface may allow the user to specify one or more passwords and/or access criteria for each of the central core and/or wallet tiers.

Figure 5C:
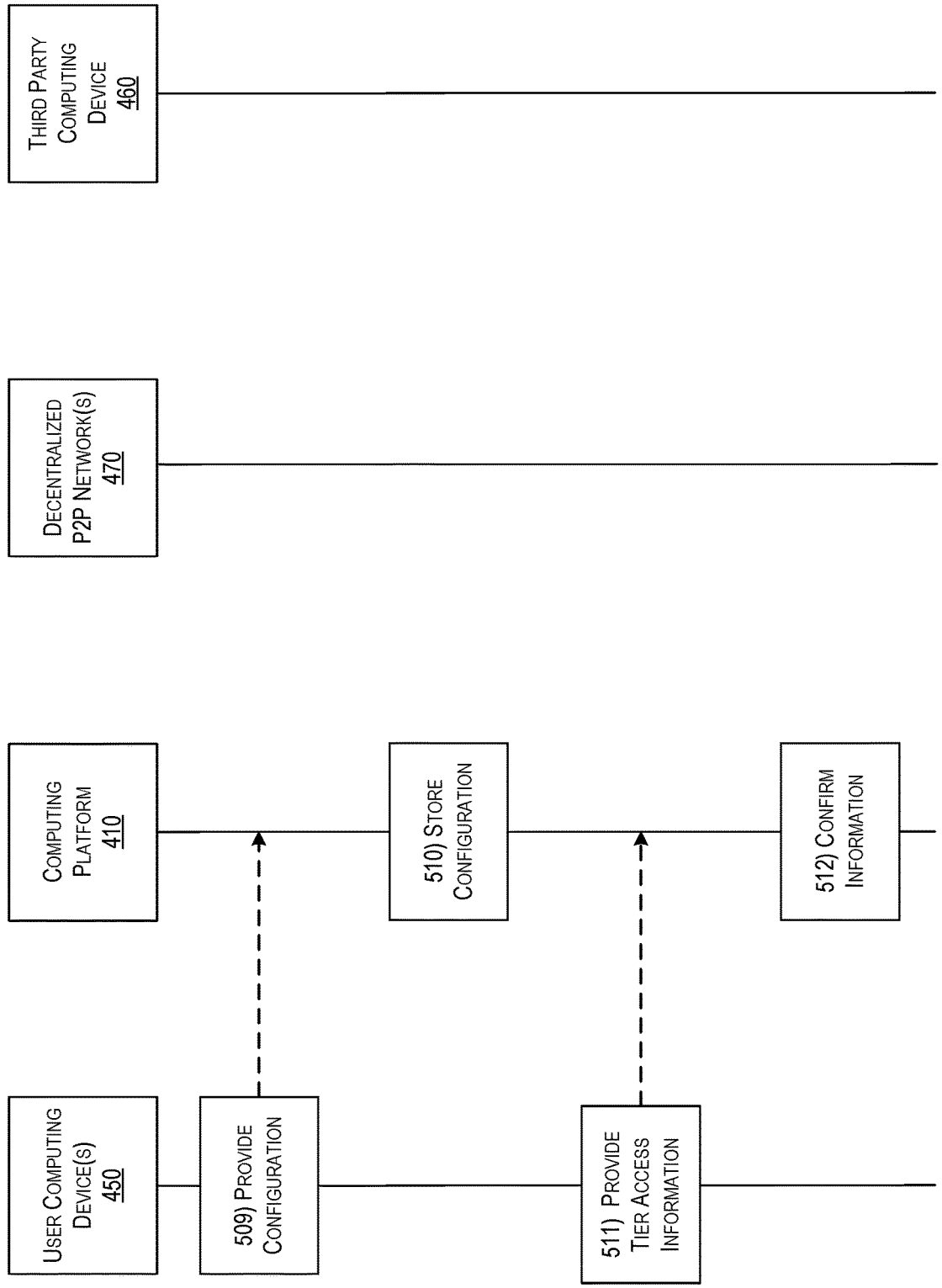

Referring to FIG. 5C, at step 509, the first user computing device of user computing devices 450 may provide the configuration information, through the configuration interface, to computing platform 410. In particular, a user of the first user computing device may specify an amount of holdings to be abstracted in the central core, a number of wallet tiers beyond the central core for which to establish logical abstractions, and an amount of digital currency holdings each of the number of specified wallet tiers.

Furthermore, the user of the first user computing device may specify one or more passwords for each of the central core and wallet tiers. For example, with respect to the central core, the user may specify one or more passwords which may include a combination of alphanumeric strings, biometric data, keystore files, third party applications, mnemonic phrases, and so on. Additionally, at least one of the one or more passwords specified by the user may be associated with an auxiliary hardware device such as a hardware wallet and/or two-factor authentication device. Through the configuration interface, the user may further specify that the central core be associated with a particular computing device (e.g., one of user computing device 450A, 450B, and 450C), that the central core may only be accessed at a predefined time, and/or that the central core may only be accessed at a predefined location. In some instances, the user may also specify that the central core may be further secured by a multi-signature contract requiring the entry of passwords and/or biometric data by one or more entities specified by the user. For example, such entities may include a spouse, bank branch manager, and so on.

In instances in which the user specifies one or more wallet tiers, the user of the first computing device may also specify one or more passwords and/or access criteria for each of the one or more wallet tiers. For example, the user may specify a single password in order to access a first tier of the digital wallet interface. In order to access a second tier of digital wallet interface, the user may specify two passwords. In order to access a third tier of the digital wallet interface, the user may specify a password, biometric data, and hardware wallet confirmation.

It should be understood that such examples are for illustrative purposes only and that the user may specify any password(s), access condition(s), and/or combination(s) thereof disclosed herein in order to access any of the central core and one or more wallet tiers. In some instances, additional password(s), access condition(s), and/or combination(s) thereof may be provided for in order to access any of the central core and one or more wallet tiers without departing from the scope of the disclosure.

Furthermore, in the event that the user of the first user computing device specified central core and/or digital wallet tier access to be allowed at one or more other user computing devices 450 (e.g., one of user computing devices 450A, 450B, and 450C), the configuration interface may instruct the user to perform steps 501-509 with each of the one or more other user computing devices.

In the event that the user of the first computing device indicated that the private keys associated with one or more decentralized P2P networks 470 were to be stored at computing platform 410, then the user may not be required to resubmit the keys for each additional user computing device. Instead, through the interface received at step 504, the user of the one or more other user computing devices of user computing devices 450 may be able access a unique identifier, such as an application ID and/or QR code, associated with the digital wallet interface downloaded and/or accessed by the one or more other user computing devices. Through the configuration interface displayed on the first user computing device of user computing devices 450 (e.g., at steps 508/509), the user may be able to enter the application ID and/or scan the QR code associated with the digital wallet interface instance downloaded and/or accessed by the one or more other user computing devices in order to link the one or more other user computing devices in the manner specified by the user in creating the digital wallet interface configuration. For example, in the this way, the user may be able to specify that a second user computing device (e.g., one of user computing devices 450A, 450B, and 450C) may access the digital wallet interface central core upon entry of one or more passwords and/or fulfillment of one or more access criteria. Similarly, the user may be able to specify that a third user computing device (e.g., one of user computing devices 450A, 450B, and 450C) may access one of the digital wallet interface tiers upon entry of one or more passwords and/or fulfillment of one or more access criteria.

In the event that the user of the first computing device indicated that the private keys associated with one or more decentralized P2P networks 470 were not to be stored at computing platform 410, then the user may be required to resubmit the keys for each additional user computing device for storage at each of the one or more user computing devices. Furthermore, through the interface received at step 504, the user of the one or more other user computing devices of user computing devices 450 may be able access a unique identifier, such as an application ID and/or QR code, associated with the digital wallet interface downloaded and/or accessed by the one or more other user computing devices. Through the configuration interface displayed on the first user computing device of user computing devices 450 (e.g., at steps 508/509), the user may be able to enter the application ID and/or scan the QR code associated with the digital wallet interface instance downloaded and/or accessed by the one or more other user computing devices in order to link the one or more other user computing devices in the manner specified by the user in creating the digital wallet interface configuration. For example, in the this way, the user may be able to specify that a second user computing device (e.g., one of user computing devices 450A, 450B, and 450C) may access the digital wallet interface central core upon entry of one or more passwords and/or fulfillment of one or more access criteria. Similarly, the user may be able to specify that a third user computing device (e.g., one of user computing devices 450A, 450B, and 450C) may access one of the digital wallet interface tiers upon entry of one or more passwords and/or fulfillment of one or more access criteria.

At step 510, computing platform 410 may receive the configuration information from the first computing device of user computing devices 450 through the configuration interface of the digital wallet interface and may store the configuration information in memory 413. In particular, the configuration information may be received by computing platform 410 through user interface engine 414*d* and stored in user account database 414*a* through instructions provided by command engine 414*b*. The configuration information may be associated in user account database 414*a* with the public and/or private keys associated with the user.

At step 511, the first user computing device of user computing devices 450 may provide access information corresponding to a first tier of the one or more tiers provided for in the configuration information. In particular, a user of the first user computing device may transmit, to the computing platform 410 and through the digital wallet interface, access information corresponding to the first tier. For example, the user may provide one or more passwords and/or access criteria for the first tier to computing platform 410. In some instances, computing platform 410 may instruct the first user computing device to display a password entry interface and the entry of the password corresponding to the first tier by the user of the first user computing device may occur through the password entry interface.

At step 512, computing platform 410 may receive the access information from the first user computing device through the digital wallet interface and may confirm the access information for the first wallet tier. In particular, command engine 414*b* may cause computing platform 410 to intake and handle the access information provided by the first user computing device through the digital wallet interface and password management engine 414*c* may cause computing platform 410 to compare the access information for the first wallet tier to the access information for the first tier stored in user account database 414*a*.

In some instances, however, the first user computing device of user computing devices 450 may provide access information to computing platform 410 which may assess the access information and provide access to either the central core, first tier, second tier, and so on, depending on the access information provided. In such instances, the access information may not be known to be directed to a particular abstraction level until authorization of the access information is assessed by computing platform 410.

Figure 5D:
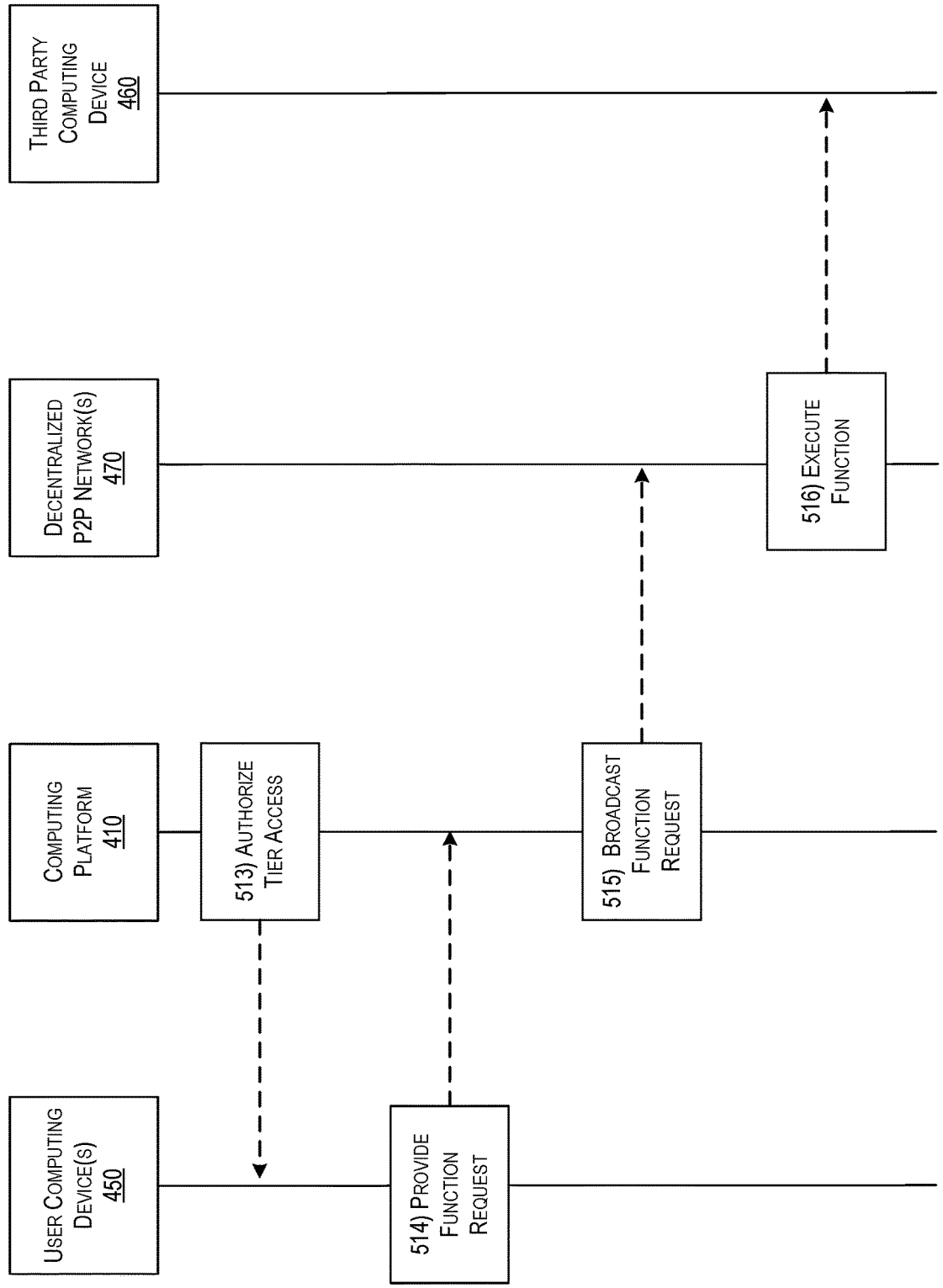

Referring to FIG. 5D, at step 513, computing platform 410 may authorize the tier access request for the first tier. In some instances, the authorization may comprise confirming that the access information provided by the first user computing device of user computing devices 450 for the first wallet tier matches the first wallet tier access information provided by the first user computing device during the configuration of the digital wallet interface at step 509. In particular, password management engine 414*c* may cause computing platform 410 to compare the access information for the first wallet tier to the access information for the first tier stored in user account database 414*a*. In providing the authorization to the first user computing device of user computing devices 450 responsive to confirming the access information, computing platform 410 may command the first user computing device to display a network function request interface through which a user of the first computing device may be able to request performance of a network function, such as a smart contract operation request and/or a transaction request, on one or more decentralized P2P networks 470.

Alternatively, in the event that computing platform 410 is unable and/or fails to confirm that the access information for the first wallet tier provided by the first user computing device of user computing devices 450 at step 511 matches the first wallet tier access information provided by the first user computing device during the configuration of the digital wallet interface at step 509, then computing platform 410 may not permit access to the first wallet tier. Instead, computing platform 410 may command the first user computing device to display an access denied message and an interface through which to re-enter the access information.

At step 514, the first user computing device of user computing devices 450 may provide one or more network function requests, through the digital wallet interface and as related to the first wallet tier, to computing platform 410. In some instances, the user of the first computing device may specify one or more types of digital currencies to be provided in the one or more network function requests, an amount of digital currency corresponding to each of the one or more types of digital currencies specified by the user, and one or more addresses (e.g., public keys) to execute the network function request in relation to, such as one or more addresses corresponding to third party computing device 460.

As an illustrative example, the user may have logically abstracted 4 BTC and 20 ETH in the first tier of the digital wallet interface. The user may specify a first network function request for the Bitcoin decentralized P2P network involving 3 BTC and an address within the Bitcoin network, and a second network function request for the Ethereum decentralized P2P network involving 10 ETH and an address within the Ethereum network.

In arrangements in which the private keys of the user are stored locally on the first user computing device through digital wallet interface, the first user computing device of user computing devices 450 may sign the network function request with the private key and perform any cryptographic hashing required to finalize the request. Alternatively, in arrangements in which the private keys of the user are stored remotely at computing platform 410, the processes of signing and hashing the request may be performed at computing platform 410.

At step 515, computing platform 410 may broadcast the network function requests to one or more decentralized P2P networks 470. For example, computing platform 410 may request execution of the network function requests related to one or more decentralized P2P networks 470, which may entail a data transfer from the digital wallet interface associated with the user of the first user computing device to a wallet associated third party computing device 460. In doing so, processors 411 of computing platform 410 may execute one or more network commands to broadcast the network function requests to one or more decentralized P2P networks 470.

Continuing with the illustrative example provided above, computing platform 410 may execute first network commands associated with the Bitcoin decentralized P2P network to broadcast the first network function request to the Bitcoin network and second network function commands associated with the Ethereum decentralized P2P network to broadcast the second network function request to the Ethereum network.

At step 516, one or more full-node computing devices of one or more decentralized P2P networks 470 may execute the requested network function requests provided by computing platform 410. In doing so, the one or more full-node computing devices of one or more decentralized P2P networks 470 may associate the digital currency value specified by the user of the first user computing device with the address also indicate in the network function requests. In some instances, the address may be associated with third party computing platform 460.

Figure 5E:
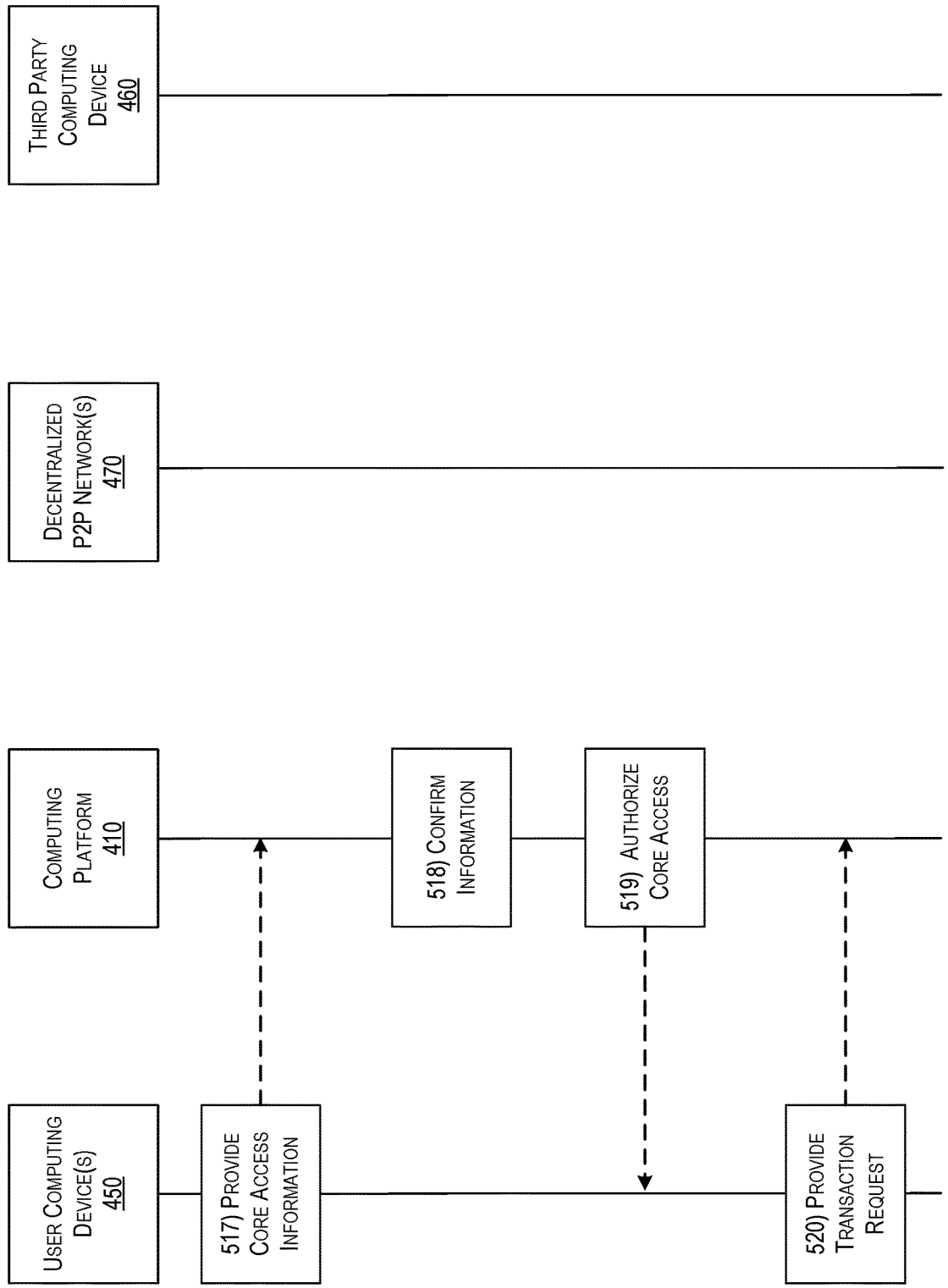

Referring to FIG. 5E, at step 517, first user computing device of user computing devices 450 may provide access information corresponding to the central core of the digital wallet interface. In particular, a user of the first user computing device may transmit, to the computing platform 410 and through the digital wallet interface, access information corresponding to the central core. For example, the user may provide one or more passwords and/or access criteria for the central core to computing platform 410. In some instances, computing platform 410 may instruct the first user computing device to display a password entry interface and the entry of the password corresponding to the central core by the user of the first user computing device may occur through the password entry interface. As stated above, in some instances, access associated with the central core may be configured to occur through another user computing device of user computing devices 450. In such cases, steps 517-522 may be performed in relation the other user computing device configured to access the central core of the digital wallet interface.

At step 518, computing platform 410 may receive the access information from the first user computing device through the digital wallet interface and may confirm the access information for the central core. In particular, command engine 414*b* may cause computing platform 410 to intake and handle the access information provided by the first user computing device through the digital wallet interface and password management engine 414*c* may cause computing platform 410 to compare the access information for the central core to the access information for the central core stored in user account database 414*a*.

Referring to FIG. 5D, at step 519, computing platform 410 may authorize the access request for the central core. In some instances, the authorization may comprise confirming that the access information provided by the first user computing device of user computing devices 450 for the central core matches the central core access information provided by the first user computing device during the configuration of the digital wallet interface at step 509. In particular, password management engine 414c may cause computing platform 410 to compare the access information for the central core to the access information for the central core stored in user account database 414a. In providing the authorization to the first user computing device of user computing devices 450 responsive to confirming the access information, computing platform 410 may command the first user computing device to display a network function request interface through which a user of the second computing device may be able to request performance of a network function, such as a smart contract operation request and/or a transaction request, on one or more decentralized P2P networks 470.

Alternatively, in the event that computing platform 410 is unable and/or fails to confirm that the access information for the central core provided by the first user computing device of user computing devices 450 at step 517 matches the central core access information provided by the first user computing device during the configuration of the digital wallet interface at step 509, then computing platform 410 may not permit access to the central core. Instead, computing platform 410 may command the second user computing device to display an access denied message and an interface through which to re-enter the access information.

At step 520, the first user computing device of user computing devices 450 may provide one or more network function requests, through the digital wallet interface and as related to the central core, to computing platform 410. In some instances, the user of the first computing device may specify one or more types of digital currencies to be provided in the one or more network function requests, an amount of digital currency corresponding to each of the one or more types of digital currencies specified by the user, and one or more addresses (e.g., public keys) to execute the network function request in relation to, such as one or more addresses corresponding to third party computing device 460.

As an illustrative example, the user may have logically abstracted 100 BTC and 2000 ETH in the central core of the digital wallet interface. The user may specify a first network function request for the Bitcoin decentralized P2P network involving 75 BTC and an address within the Bitcoin network, and a second network function request for the Ethereum decentralized P2P network involving 1000 ETH and an address within the Ethereum network.

In arrangements in which the private keys of the user are stored locally on the first user computing device through digital wallet interface, the first user computing device of user computing devices 450 may sign the network function request with the private key and perform any cryptographic hashing required to finalize the request. Alternatively, in arrangements in which the private keys of the user are stored remotely at computing platform 410, the processes of signing and hashing the request may be performed at computing platform 410.

Figure 5F:
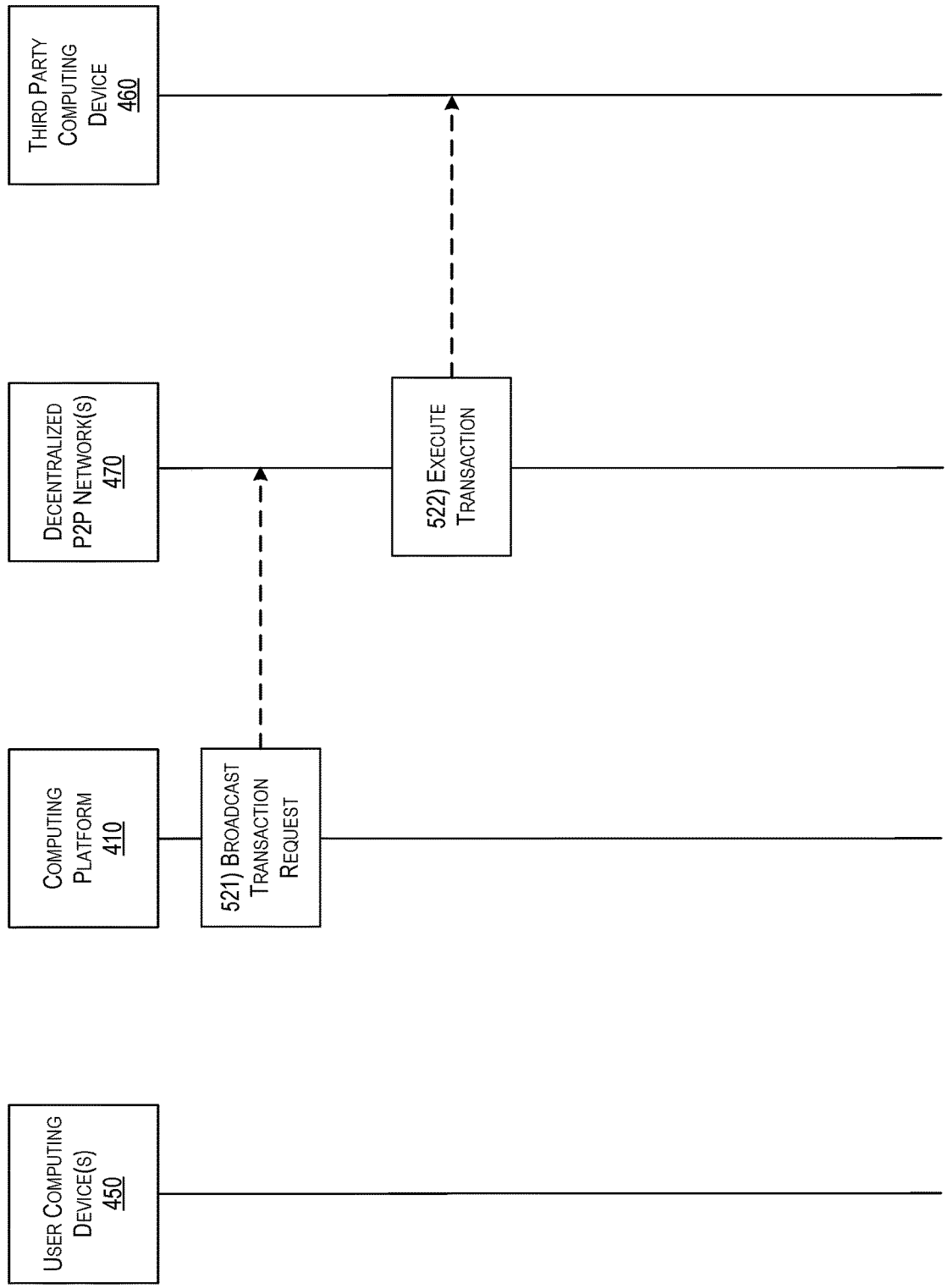

Referring to FIG. 5F, at step 521, computing platform 410 may broadcast the network function requests to one or more decentralized P2P networks 470. For example, computing platform 410 may request execution of the network function requests related to one or more decentralized P2P networks 470, which may entail a data transfer from the digital wallet interface associated with the user to a wallet associated third party computing device 460. In doing so, processors 411 of computing platform 410 may execute one or more network commands to broadcast the network function requests to one or more decentralized P2P networks 470.

Continuing with the illustrative example provided above, computing platform 410 may execute first network commands associated with the Bitcoin decentralized P2P network to broadcast the first network function request to the Bitcoin network and second network function commands associated with the Ethereum decentralized P2P network to broadcast the second network function request to the Ethereum network.

At step 522, one or more full-node computing devices of one or more decentralized P2P networks 470 may execute the requested network function requests provided by computing platform 410. In doing so, the one or more full-node computing devices of one or more decentralized P2P networks 470 may associate the digital currency value specified by the user of the second user computing device with the address also indicated in the network function requests. In some instances, the address may be associated with third party computing platform 460.

In some arrangements, the processes described in steps 517-522 may be performed in relation to one or more other user computing devices (e.g., one or more of user computing devices 450A, 450B, and 450C) of user computing devices 450. While steps 517-522 are described in relation to the center core of the digital wallet interface, similar processes may be performed for one or more digital wallet tiers of the digital wallet interface. In such instances, the processes described in steps 517-522 may also be performed in relation to one or more other user computing devices (e.g., one or more of user computing devices 450A, 450B, and 450C) of user computing devices 450.

Figure 6:
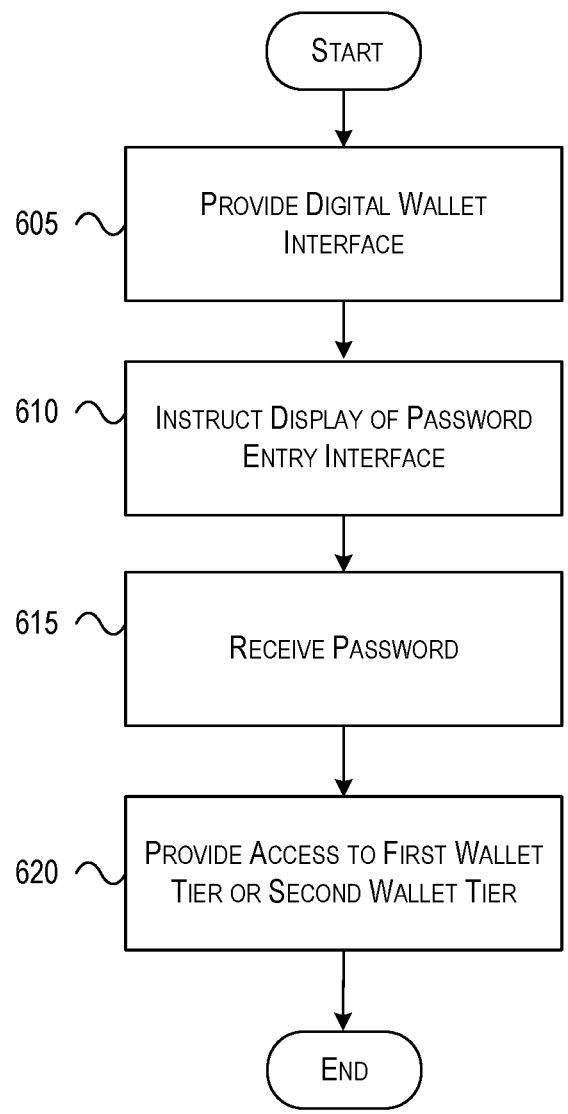
FIG. 6 depicts an illustrative method for facilitating multi-tiered digital wallet security in accordance with one or more example embodiments described herein.

FIG. 6 depicts an illustrative method for facilitating multi-tiered digital wallet security in accordance with one or more example embodiments described herein. Referring to FIG. 6, at step 605, a computing platform configured to operate in a P2P network and including at least one or more processors and memory storing at least a digital wallet interface may provide the digital wallet interface to a user computing device. At step 610, the computing platform may instruct the user computing device to display a password entry interface. At step 615, the computing platform may receive, through the password entry interface, a password, wherein a first password corresponds to a first wallet tier of the digital wallet interface and a second password corresponds to a second wallet tier of the digital wallet interface. At step 620, the computing platform may provide access to either the first tier or the second tier of the digital wallet interface based on whether the password provided by the user is the first password or the second password.

Although the subject matter has been described in language specific to particular blockchains, structural features and/or methodological acts, it is to be understood that the subject matter defined in the appended claims is not necessarily limited to the specific blockchains, features or acts described above. Rather, the blockchains, features and acts described above are described as illustrative implementations of the following claims.

The invention claimed is:
1. A method, comprising:
at a computing platform configured to operate in a decentralized peer-to-peer (P2P) network, the computing platform including at least one or more processors and memory storing at least a digital wallet interface:
providing the digital wallet interface to a user computing device;

receiving a public/private key pair associated with the P2P network;

retrieving digital currency holding information based on a public key of the public/private key pair;

receiving, from the user computing device, compartmentalization data associated with the digital currency, the compartmentalization data including a plurality of wallet tiers each wallet tier associated with an amount of digital currency;

executing a network command to broadcast a network function request to the P2P network, the network function request including execution of a transfer of a first amount of digital currency;

instructing the user computing device to display a password entry interface;

receiving, from the user computing device through the password entry interface, a password, wherein a first password corresponds to a first wallet tier of the digital wallet interface and a second password corresponds to a second wallet tier of the digital wallet interface;

based on whether the password provided by the user is the first password or the second password, providing access to a tier of the digital wallet interface corresponding to the password provided by the user;

authorize the transfer of the first amount of digital currency based on the password provided by the user and the public/private key pair;

executing the transfer of the first amount of digital currency from the tier of the digital wallet interface corresponding to the password provided by the user based on the authorizing, executing the transfer including adding a new block to a blockchain, the new block including a block hash including at least a digest of the network function request; and broadcast the blockchain, including the new block, to each full node in the centralized P2P network.

2. The method of claim 1, wherein the first password is associated with a first alphanumeric string and the second password is associated with a second alphanumeric string, and wherein the second alphanumeric string is longer than the first alphanumeric string.

3. The method of claim 1, wherein the first tier wallet is associated with a first amount of funds and the second tier wallet is associated with a second amount of funds, and wherein the second amount of funds is greater than the first amount of funds.

4. The method of claim 3, wherein the digital wallet interface associated with the user comprises a central core and a plurality of wallet tiers, including at least the first wallet tier and the second wallet tier.

5. The method of claim 4, wherein the central core of the digital wallet interface is associated with a third amount of funds greater than the first amount of funds associated with the first tier wallet and the second amount of funds associated with the second tier wallet.

6. The method of claim 5, wherein the central core of the digital wallet interface is associated with a multi-signature password.

7. The method of claim 6, wherein at least a first-signature password comprising the multi-signature password is required to be entered by an entity within a particular geographical region.

8. A computing platform configured to operate in a decentralized peer-to-peer (P2P) network, comprising:

one or more processors; and memory storing at least a digital wallet interface and computer-readable instructions that, when executed by the one or more processors, cause the computing platform to:

provide the digital wallet interface to a user computing device;

receive a public/private key pair associated with the P2P network;

retrieve digital currency holding information based on a public key of the public/private key pair;

receive, from the user computing device, compartmentalization data associated with the digital currency, the compartmentalization data including a plurality of wallet tiers each wallet tier associated with an amount of digital currency;

execute a network command to broadcast a network function request to the P2P network, the network function request including execution of a transfer of a first amount of digital currency;

instruct the user computing device to display a password entry interface;

receive, from the user computing device through the password entry interface, a password, wherein a first password corresponds to a first wallet tier of the digital wallet interface and a second password corresponds to a second wallet tier of the digital wallet interface;

based on whether the password provided by the user is the first password or the second password, provide access to a tier of the digital wallet interface corresponding to the password provided by the user;

authorize the transfer of the first amount of digital currency based on the password provided by the user and the public/private key pair;

execute the transfer of the first amount of digital currency from the tier of the digital wallet interface corresponding to the password provided by the user based on the authorizing, executing the transfer including adding a new block to a blockchain, the new block including a block hash including at least a digest of the network function request; and broadcast the blockchain, including the new block, to each full node in the centralized P2P network.

9. The computing platform of claim 8, wherein the first password is associated with a first alphanumeric string and the second password is associated with a second alphanumeric string, and wherein the second alphanumeric string is longer than the first alphanumeric string.

10. The computing platform of claim 8, wherein the first tier wallet is associated with a first amount of funds and the second tier wallet is associated with a second amount of funds, and wherein the second amount of funds is greater than the first amount of funds.

11. The computing platform of claim 10, wherein the digital wallet interface associated with the user comprises a central core and a plurality of wallet tiers, including at least the first wallet tier and the second wallet tier.

12. The computing platform of claim 11, wherein the central core of the digital wallet interface is associated with a third amount of funds greater than the first amount of funds associated with the first tier wallet and the second amount of funds associated with the second tier wallet.

13. The computing platform of claim 12, wherein the central core of the digital wallet interface is associated with a multi-signature password.

14. The computing platform of claim 13, wherein at least a first-signature password comprising the multi-signature password is required to be entered by an entity within a particular geographical region.

15. One or more non-transitory computer-readable media storing computer-executable instructions that, when executed by a computing platform configured to operate in a decentralized peer-to-peer (P2P) network, cause the computing platform to:

provide a digital wallet interface to a user computing device;

receive a public/private key pair associated with the P2P network;

retrieve digital currency holding information based on a public key of the public/private key pair;

receive, from the user computing device, compartmentalization data associated with the digital currency, the compartmentalization data including a plurality of wallet tiers each wallet tier associated with an amount of digital currency;

execute a network command to broadcast a network function request to the P2P network, the network function request including execution of a transfer of a first amount of digital currency;

instruct the user computing device to display a password entry interface;

receive, from the user computing device through the password entry interface, a password, wherein a first password corresponds to a first wallet tier of the digital wallet interface and a second password corresponds to a second wallet tier of the digital wallet interface; and based on whether the password provided by the user is the first password or the second password, provide access to a tier of the digital wallet interface corresponding to the password provided by the user;

authorize the transfer of the first amount of digital currency based on the password provided by the user and the public/private key pair;

execute the transfer of the first amount of digital currency from the tier of the digital wallet interface corresponding to the password provided by the user based on the authorizing, executing the transfer including adding a new block to a blockchain, the new block including a block hash including at least a digest of the network function request; and broadcast the blockchain, including the new block, to each full node in the centralized P2P network.

16. The one or more non-transitory computer-readable media of claim 15 wherein the first password is associated with a first alphanumeric string and the second password is associated with a second alphanumeric string, and wherein the second alphanumeric string is longer than the first alphanumeric string.

17. The one or more non-transitory computer-readable media of claim 15, wherein the first tier wallet is associated with a first amount of funds and the second tier wallet is associated with a second amount of funds, and wherein the second amount of funds is greater than the first amount of funds.

18. The one or more non-transitory computer-readable media of claim 17, wherein the digital wallet interface associated with the user comprises a central core and a plurality of wallet tiers, including at least the first wallet tier and the second wallet tier.

19. The one or more non-transitory computer-readable media of claim 18, wherein the central core of the digital wallet interface is associated with a third amount of funds greater than the first amount of funds associated with the first tier wallet and the second amount of funds associated with the second tier wallet.

20. The one or more non-transitory computer-readable media of claim 19, wherein the central core of the digital wallet interface is associated with a multi-signature password, and wherein at least a first-signature password comprising the multi-signature password is required to be entered by an entity within a particular geographical region.

* * * * *